United States Patent [19]
Hwang et al.

[11] Patent Number: 5,570,723
[45] Date of Patent: Nov. 5, 1996

[54] SUPPORT SYSTEM AND METHOD FOR JACKETED MULTIPLE CRYOGENIC PIPES FOR CYROGENIC FLUID TRANSFER

[75] Inventors: Kwang-Fu P. Hwang, Macungie; Alexander P. Varghese; David D. Nguyen, both of Bethlehem; Thomas Joseph, Macungie, all of Pa.

[73] Assignee: Air Products and Chemicals, Inc., Allentown, Pa.

[21] Appl. No.: 296,831

[22] Filed: Aug. 26, 1994

[51] Int. Cl.[6] ................................... F16L 9/18
[52] U.S. Cl. ...................... 138/111; 138/106; 138/112; 62/50.7
[58] Field of Search ................ 138/111–114, 106; 62/50.7

[56] References Cited

U.S. PATENT DOCUMENTS

| 3,144,050 | 8/1964 | Maloney | 138/106 |
|---|---|---|---|
| 3,361,870 | 1/1968 | Whitehead | 138/111 X |
| 3,379,027 | 4/1968 | Mowell et al. | 62/50.7 |
| 3,590,855 | 7/1971 | Woollen | 138/111 X |
| 3,765,629 | 10/1973 | Voelker et al. | 138/106 X |
| 3,899,005 | 8/1975 | Klimpl | 138/111 X |
| 3,986,341 | 10/1976 | DeHaan | 62/50.7 |
| 3,992,169 | 11/1976 | Loudon | 62/50.7 |
| 4,036,617 | 7/1977 | Leonard et al. | 62/50.7 |
| 4,877,153 | 10/1989 | Varghese et al. | 220/469 |
| 5,400,602 | 3/1995 | Chang et al. | 138/111 X |

Primary Examiner—Timothy F. Simone
Assistant Examiner—Patrick F. Brinson
Attorney, Agent, or Firm—James C. Simmons

[57] ABSTRACT

An assembly and method for supporting a plurality of individually insulated pipes or conduits inside a vacuum jacket where the insulated pipes are positioned or fixed relative to one another and the inside surface of the vacuum jacket.

12 Claims, 5 Drawing Sheets

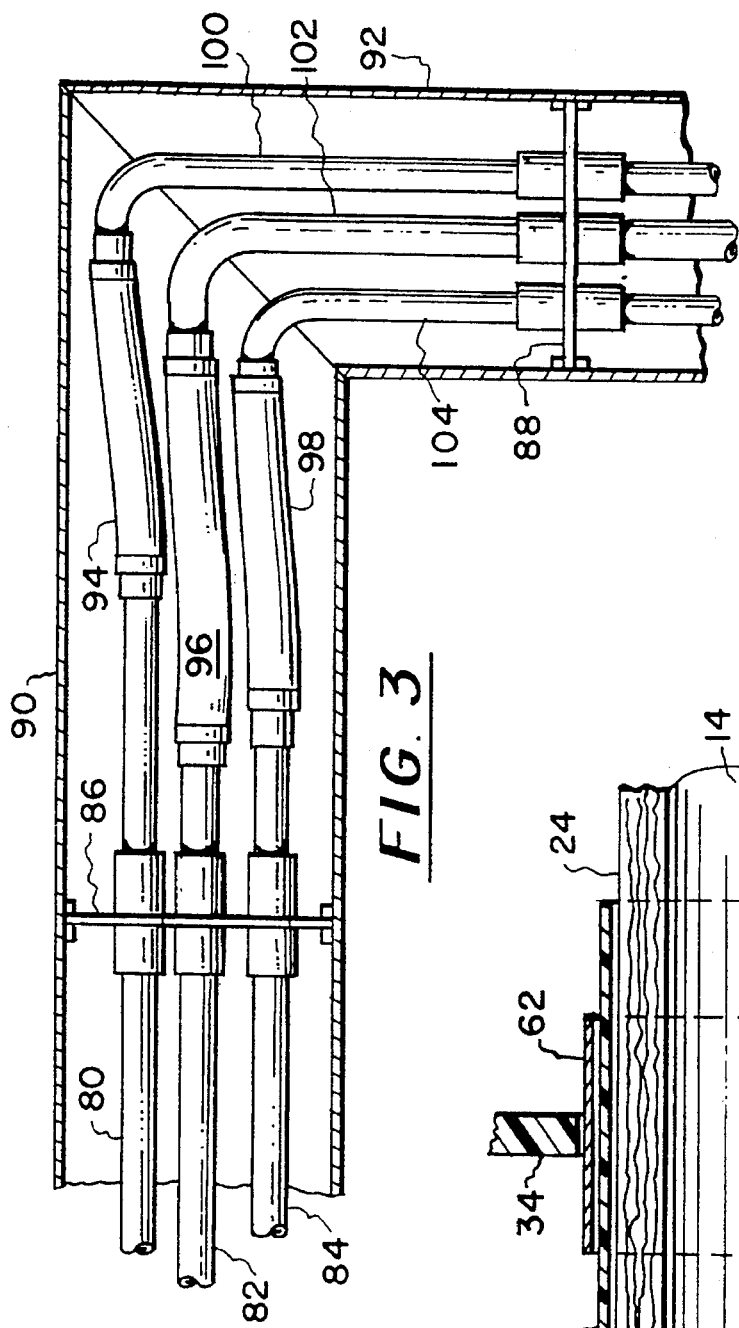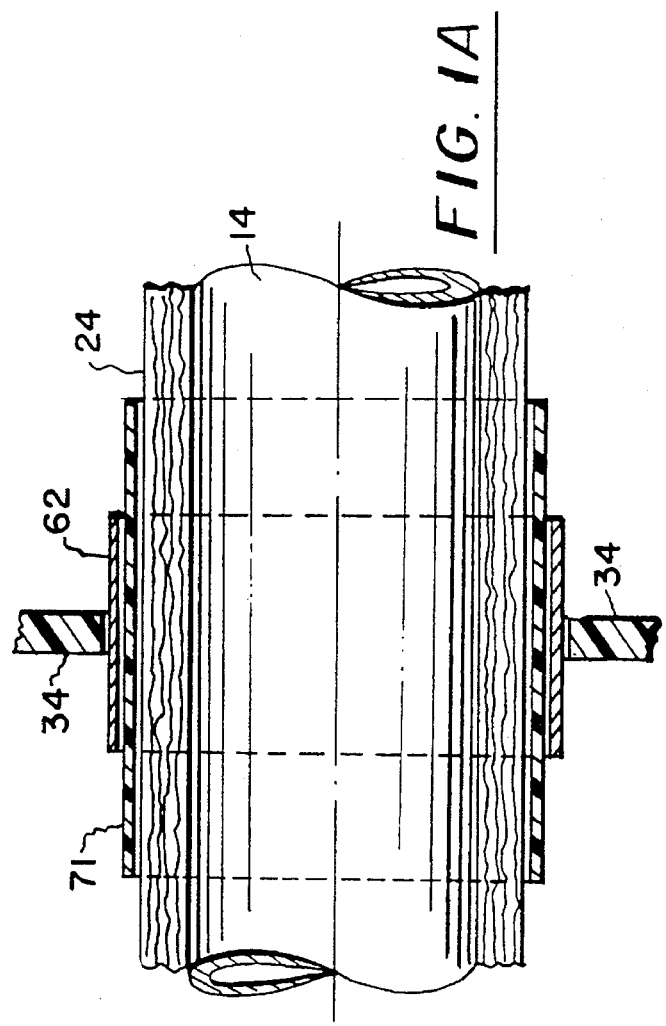

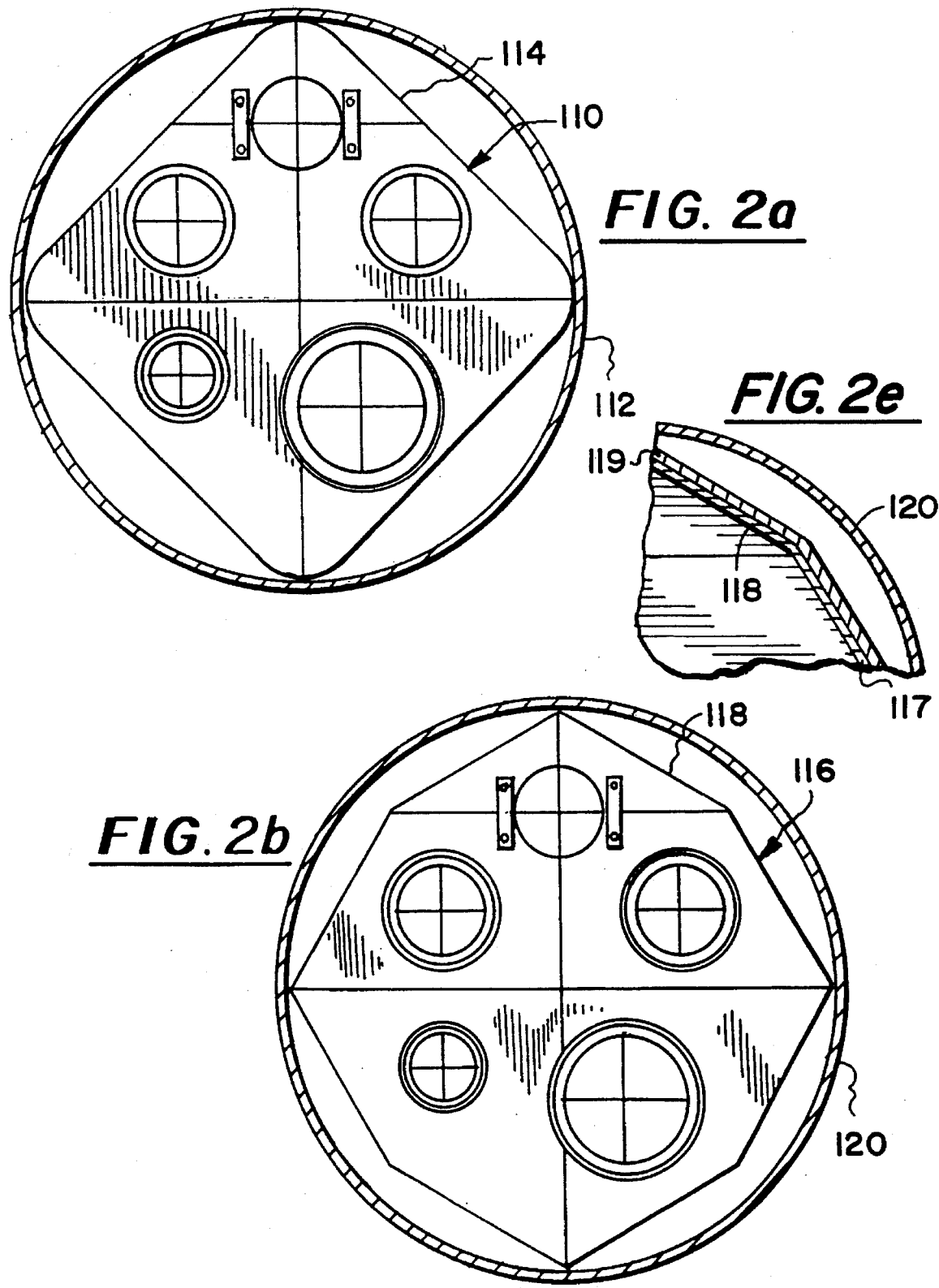

SUPPORT SYSTEM AND METHOD FOR JACKETED MULTIPLE CRYOGENIC PIPES FOR CYROGENIC FLUID TRANSFER

FIELD OF THE INVENTION

The present invention pertains to positioning and supporting multiple cryogenic pipes or conduits inside of a jacket or vessel.

BACKGROUND OF THE INVENTION

Superconducting devices such as magnets are used for diverse applications such as the Particle Accelerators and transportation on systems, such as the Maglev rail cars. Common to the use of superconducting magnets is the need for cooling the magnets using a liquefied cryogen such as helium which has a normal boiling point of 4.2° K. (—453° F., −270° C.). Normally, the liquefied helium is stored in a tank or dewar or produced in a liquefier and transferred via a piping system to the magnet. In order to maximize the refrigeration value, the transfer of the helium should take place in the liquid state, thus necessitating the use of insulated piping in the transfer system. As is well known in the art of cryogenic storage vessels, an outer vacuum jacket combined with insulation around the inner tank and the use of radiation shields and superinsulation can effectively achieve storage of liquefied cryogens such as helium. U.S. Pat. No. 4,877,153 discloses a method of utilization of a vacuum jacketed inner vessel to prevent loss of liquid cryogen due to heat infiltration as the cryogen is stored in the dewar. Liquid withdrawn from such a tank or dewar would be transferred via insulated piping to the point of use. Transfer piping for use with helium usually contains a plurality of conduits to both conduct the liquid helium to the point of use to cool the magnet and associated piping as well as to return vaporized cryogen for recovery and reuse. In disposing a multiple number of conduits inside a jacket, there is a need to space the pipes so that if they are conducting fluids at different temperatures, they will not serve to transfer heat between the pipes and/or to cause unnecessary warming of fluid going to the point of use by returning fluid.

SUMMARY OF THE INVENTION

In order to avoid the above-mentioned problems and to provide an improved assembly and method for supporting a plurality of pipes or conduits for transfer and return of cryogenic fluids, it has been discovered that the pipes can be individually insulated continuously, installed inside of a low heat leak or low thermally conductive support, which support is adapted to fit inside of a vacuum jacket, and the entire assembly can then be installed inside of the vacuum jacket, the jacket sealed and evacuated. It is also possible to deploy radiation shields around the subassembly of the insulated pipes and the supports as well as a blanket of a multilayer insulation (MLI) around the radiation shield prior to installing the entire subassembly in the jacket. The improved assembly and method for supporting facilitate individual pipes as well as the total assembly of the inner lines to move independently inside the vacuum jacket to accommodate the large thermal contractions caused by the ultra low temperatures.

BRIEF DESCRIPTION OF THE DRAWING

FIG. 1a is an enlarged detail of the placement of one conduit in the conduit spacer assembly.

FIGS. 2a, 2b, 2c, and 2d are cross-sectional views of alternate embodiments of the supporting members shown in FIG. 1.

FIG. 2E is a detail of a portion of FIG. 2B showing the disposition of an optional radiation shield and multilayer insulatioin blanket.

FIG. 3 is a longitudinal fragmentary view showing use of the present invention in relation to bending or turning jacketed piping.

DESCRIPTION OF THE PREFERRED EMBODIMENT

Figure 1:
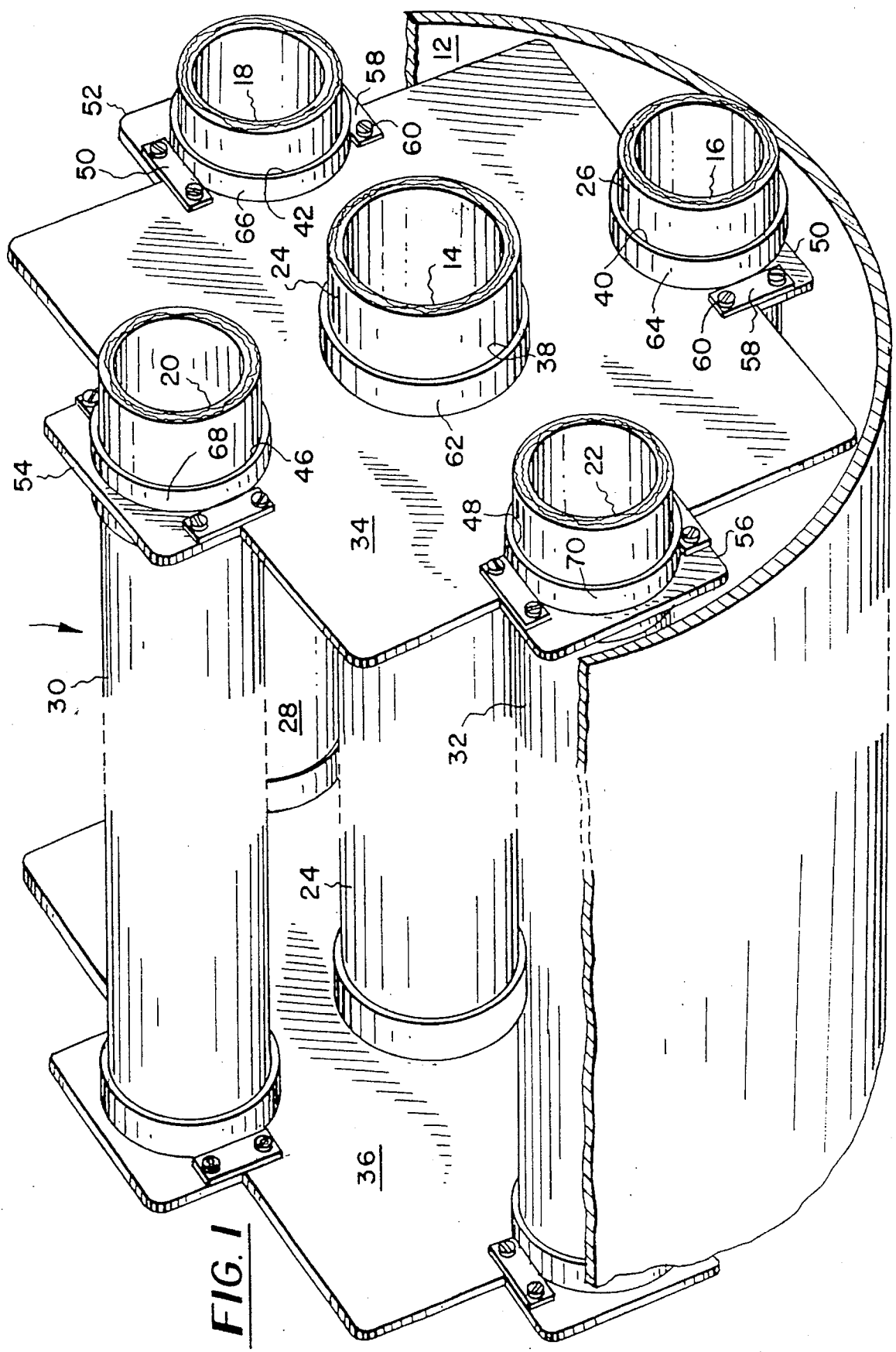
FIG. 1 is a perspective view of an assembly according the present invention with portions broken away for clarity.

In FIG. 1, numeral 10 refers to the assembly according to the present invention. Assembly 10 includes an outer sleeve or jacket 12 fabricated from a structural material such as stainless steel, alloy steel or carbon steel which can be closed and evacuated to create a vacuum space inside thereof.

A plurality of pipes or conduits 14, 16, 18, 20 and 22 to be disposed inside of the jacket 12 are first covered with a multilayer insulation 24, 26, 28, 30 and 32, respectively. Multilayer insulation 24, 26, 28, 30 and 32 is commonly referred to as superinsulation in the trade and is available in various combinations of layers of a reflective metal such as aluminum, a plastic overlay such as Mylar, and insulating paper. Various types of multilayer insulation use different schemes in alternating the layers of aluminum, Mylar and paper, as is well known in the art. Each of the pipes or conduits 14, 16, 18, 20 and 22 can be wrapped with the multilayer insulation utilizing automatic techniques to achieve uniform disposition of the multilayer insulation around the pipe or tube. The individual pipes 14, 16, 18, 20 and 22 thus insulated can be positioned by inserting into complimentary apertures in a pipe support 34, 36 fabricated from a low thermally conductive material such as cloth reinforced fiber glass epoxy sold under the designations G-7, G-8, G-10 and G-11. Individual supports 34, 36 are fabricated in the shape of a slab or disk that will easily slip into the jacket 12. In the case of the disks or supports 34, 36 shown in FIG. 1, they are in the shape of a square with a central aperture 38 to support conduit 14 and notches 40, 42, 46 and 48 in the outer edges of each side of the square to support a portion of the circumference of pipes 16, 18, 20 and 22, respectively. Pipes 16, 18, 20 and 22 are positioned rigidly to the support 34 by means of pipe retainers 50, 52, 54 and 56, respectively. Pipe retainers 50, 52, 54 and 56 are fabricated from the same material that support 34 is fabricated from. Pipe retainers 50, 52, 54 and 56 are fastened to the pipe support 34 by means of retainer clips 58 and screws or like fasteners 60. The clips 50 can be fabricated from material similar to the materials of construction of the support 34 and the pipe retainers 50, 52, 54 and 56. Disposed between each of the individual pipe assemblies 14, 16, 18, 20 and 22 is a sleeve 62, 64, 66, 68 and 70 and low friction overwrap 71 shown in detail in FIG. 1a (shown in relation to the pipes passing through support 34, like sleeves being used with each pipe support) to facilitate installation of the insulated pipes into the supports but, more importantly, to provide for movement of the individual pipes as will hereinafter be more fully explained. The sleeves 62, 64, 66, 68 and 70 can be fabricated from metals such as aluminum and stainless steel and plastics like nylon or Teflon for low fraction overwrap 71. The sleeves can be a seamless tubing or can be a thin sheet of the material overlapped on itself to provide the sleeve.

In service, the individual pipes or conduits 14, 16, 18, 20 and 22 will be wrapped with the multilayer insulation 24, 26, 28, 30 and 32 and the individual pipes supported in a plurality of supports 34, 36, and the like. The length of the subassembly will depend upon the length of straight run of the pipes and the number of supports 34, 36 will be selected depending upon the size of the pipe, the weight of the fluid in the pipes and the temperatures to which the pipes will be subjected, all of which act to support the pipes without sagging and contacting one another or the jacket 12 to thus prevent thermal shorting. The subassembly of the pipes and the supports can then be covered with a radiation shield as is well known in the art and as discussed in U.S. Pat. 4,877,153, the specification of which is incorporated herein by reference. Radiation shields are well known to a worker skilled in the art and have not been illustrated for the sake of clarity. Overlying the radiation shield can be a blanket of multilayer insulation such as discussed in the aforementioned patent and also known to a worker skilled in the art. However, the use of the radiation shield and the multilayer insulation are unique to the device of the present invention.

Shown in FIG. 3 is a sub-assembly according to the present invention wherein a plurality of pipes 80, 82, 84 are supported in supports 86 and 88 which are disposed in vacuum jackets 90, 92 disposed at a right angle to one another. Conduits 80, 82 and 84 mate with flexible connectors 94, 96, 98 which, in turn, mate with continuing conduits 100, 102, 104 which pass through and are positioned by support 88. Conduits 100, 102 and 104 are fabricated with a bend to accommodate turning of the entire subassembly 90° to fit inside the vacuum jackets 90, 92 which are welded together. The supports 86, 88 assure that the conduits 80, 82, 84, 100, 102 and 104 are positioned relative to each other and will not become thermally shorted by contact with one another.

Referring back to FIG. 1, a device such as shown can be used to cool a superconducting magnet by having conduit 14 carry a coolant such as liquid helium directly to the dewar holding the magnet, conduit 16 carrying liquid helium to cool the heat shield, conduit 18 carrying liquid helium or another cryogen to cool related equipment such as super computers, conduit 20 carrying liquid helium or other coolant to cool the magnet dewar, and pipe 22 used to return vaporized coolant to the storage dewar or to a unit for reliquefaction and reuse.

Figure 2C:
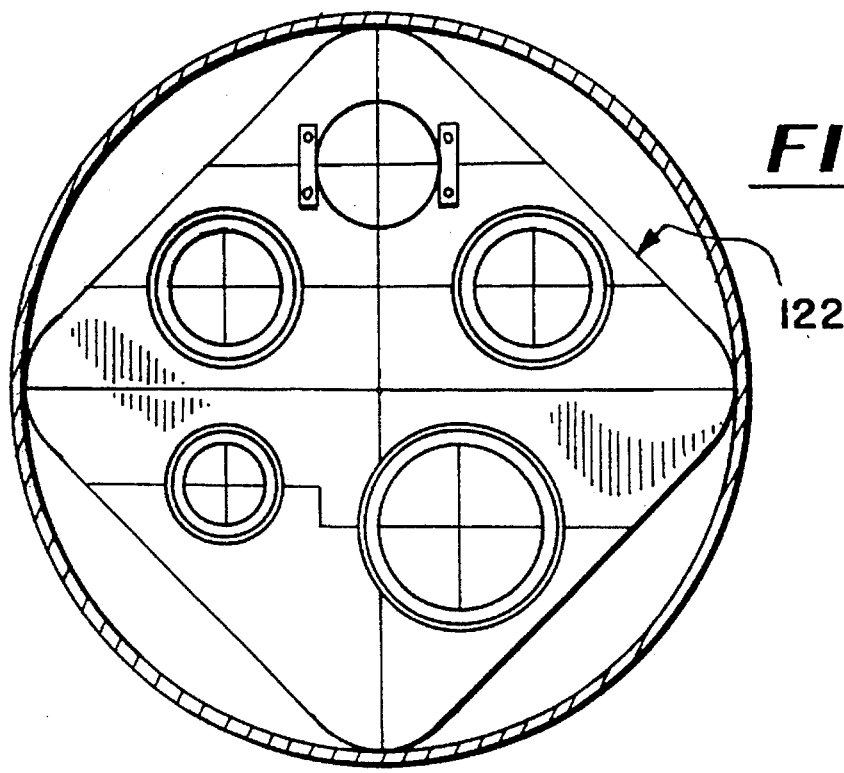

FIGS. 2A, 2B and 2C show alternate designs for positioning up to five pipes inside of a vacuum jacket. For example, in FIG. 2A, the support 110 is in the form of a square whose diagonals are equal to or slightly less than the inside diameter of the jacket 112. Support 110 has a plurality of fixed holes and a removable retainer 114 to aid in the assembly and installation inside of vacuum jacket 112.

FIG. 2B shows a support 116 in the form of a multi-sided polygon having a separate retainer section 118 to allow the installation of the radiation shield cooling line.

FIG. 2E, which is a detail of a portion of FIG. 2B, shows the disposition of optional radiation shield 117 and optional multilayer insulation blanket 119 along retainer section 118.

FIG. 2C is an alternate embodiment of the square of FIG. 2A showing a multi-piece approach to the support 122.

Figure 2D:
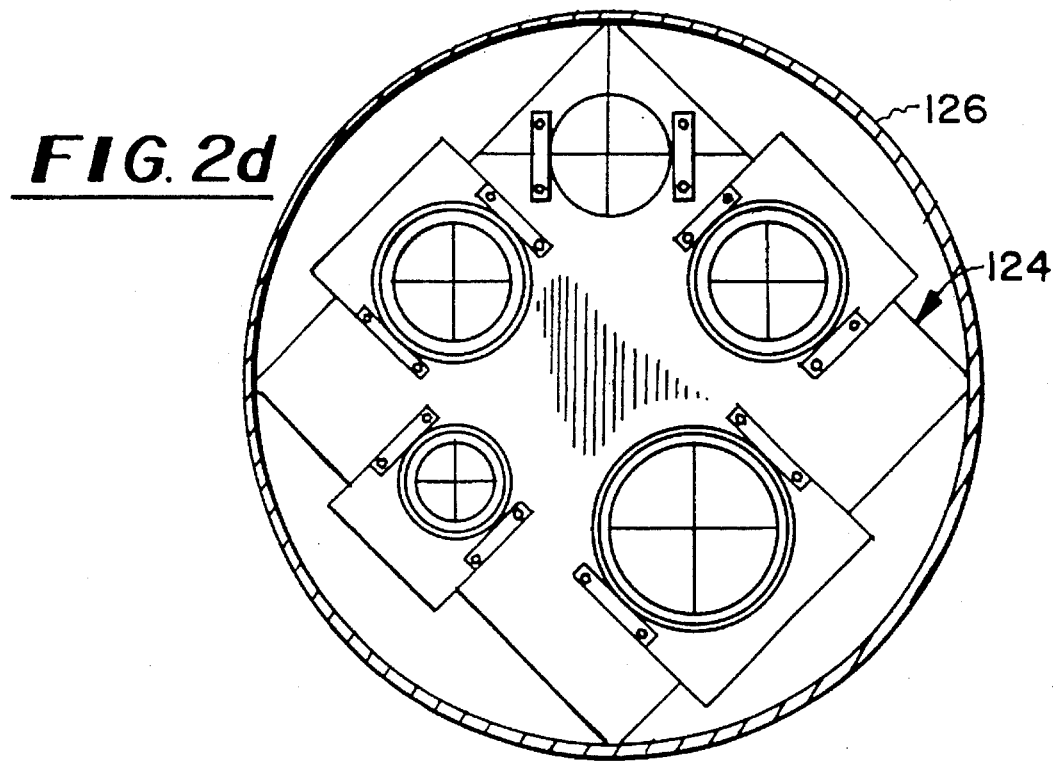

FIG. 2D is an alternate embodiment of the support of FIG. 1 wherein the support 124 has a combination of the diagonals of the square to fit inside of the jacket 126 and retainer clips and complimentary recesses to fix the conduits to the support 124.

Figure 4:
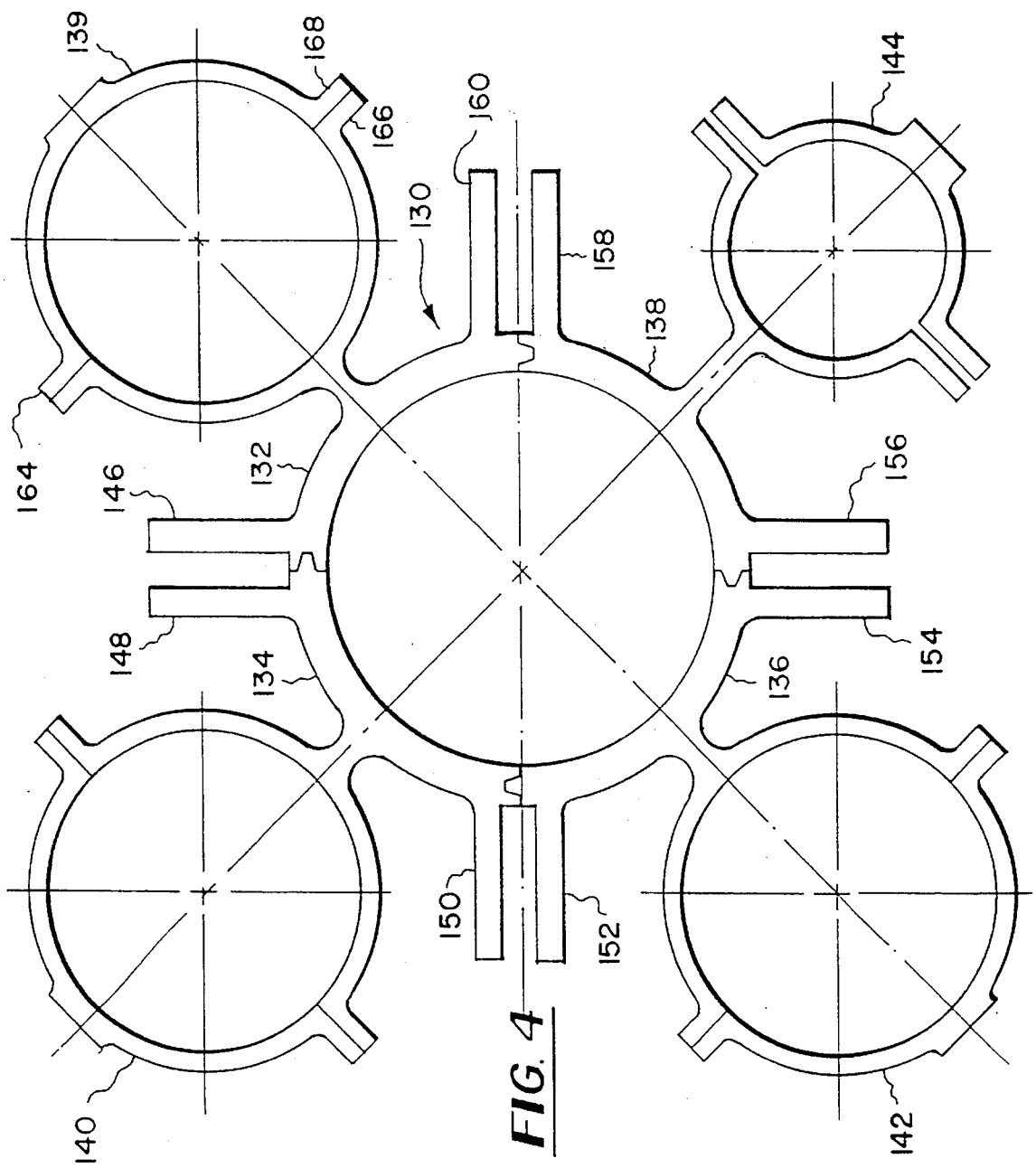
FIG. 4 is a cross-sectional view of an easily fabricated support member according to the present invention.

FIG. 4 illustrates another form of support member 130 which can be formed from individual base sections 132, 134, 136 and 138 and complimentary pipe retainers 139, 140, 142, 144. Base sections 132, 134, 136 and 138 and pipe retainers 138, 140, 142 and 144 can be formed from materials of construction for use in cryogenic service such as the cloth reinforced fiber glass epoxy. One preferred material is aluminum which can be extruded into the shapes shown. The aluminum extrusion can be cut to a desired thickness which is dictated by the thermal properties desired in the support. Different sections can be extruded to accommodate different size pipes or tubes and the final assembly can accommodate a large number of pipes or tubes. The base sections 132, 134, 136 and 138 are held together by fasteners (not shown) passing through suitable apertures in facing ears or projections 146 and 148, 150 and 152, 154 and 156, and 158 and 160. Pipe retainers 139, 140, 142 and 144 can be fastened to their respective base portions by similar ears or projections, e.g. 162 and 164 and 166 and 168 shown with base 132 and pipe retainer 139 in similar manner. Support 130 eliminates the need for sleeves on the insulated pipes, thus further simplifying construction. Supports such as 130 can be wrapped with a radiation shield and/or multilayer insulating blanket if required.

The method and the apparatus of the invention facilitates transferring of a cryogenic fluid such as helium from a refrigeration plant or a storage dewar to machinery or apparatus which requires cooling. In particular, the system of the present invention permits a plurality of insulated pipes to be fixed inside of a vacuum jacket. The system results in economic benefits since the pipes can be insulated prior to being assembled inside the supports and the pipe and supports with or without radiation shields and superinsulating blankets can be readily installed inside of the vacuum jacket. Individual pipes can be assembled one at a time, and the supports can be used for a multiplicity of applications requiring up to the maximum number of pipes to be supported inside of a vacuum jacket.

In view of the fact that the individual pipes can experience thermal cycles from room temperature to −453° F. during operation, thermal shrinkage of each pipe can be different frown the other pipes in the vacuum jacket. The assembly of the present invention permits movement of each individual pipe relative to its support without affecting the other pipes in the subassembly. The use of continuous multilayer insulation wrapping of the individual pipes prior to assembly results in better thermal performance and lower labor costs since the wrapping can be accomplished by machines instead of by hand. The use of the prefabricated supports facilitates assembly and alignment of a plurality of pipes for insulation into the vacuum jacket.

Having thus described our invention, what is desired to be secured by Letters Patent of the United States is set forth in the appended claims.

We claim:

1. An assembly of a plurality of pipes or conduits for cryogenic fluid transfer inside a vacuum jacket comprising in combination:

a plurality of supports, each of said supports having means to receive said pipes and position said pipes in fixed position relative to each other and relative to said vacuum jacket, said supports are to be slidably inserted inside a vacuum jacket together with said pipes; and each of said pipes covered with a multilayer superinsulation and overwrapped by a relatively thick ("0.005") layer of a low friction synthetic material.

2. An assembly according to claim 1 wherein said means to receive said pipes is an aperture and wherein metal sleeves are disposed between each of said apertures in said support and each of said insulated and overwrapped pipes where said pipes pass through said apertures in said supports.

3. An assembly according to claim 1 wherein said super insulation is a composite of Mylar, aluminum foil and paper.

4. An assembly according to claim 1 wherein said supports are fabricated from a cloth reinforced fiber glass epoxy fabricated into a flat disc shape creating at least one passage between said support and said vacuum jacket.

5. An assembly according to claim 1 wherein said low friction synthetic overwrap material is selected from the group consisting of synthetic polymers and under the trademarks of MYLAR and TEFLON.

6. An assembly according to claim 1 wherein said sleeves are fabricated from aluminum.

7. An assembly according to claim 1 wherein said sleeves are fabricated from stainless steel.

8. An assembly according to claim 1 wherein a continuous radiation shield is disposed around said supports and adjacent to an inner wall of said vacuum jacket.

9. An assembly according to claim 8 wherein a multilayer insulation blanket is disposed between said shield and said inner wall of said vacuum jacket.

10. An assembly according to claim 1 wherein vacuum jacket is generally cylindrical in shape and supports are in the shape of a round cornered square having a diagonal equal to less than the inside diameter of said vacuum jacket.

11. An assembly according to claim 1 wherein said supports are in the shape of polygon having n sides where n is greater than three.

12. An assembly according to claim 1 wherein said supports are in the shape of pipe supports disposed in a generally spoked array around a central aperture.

* * * * *

UNITED STATES PATENT AND TRADEMARK OFFICE
CERTIFICATE OF CORRECTION

PATENT NO.    : 5,570,723

DATED         : Nov. 5, 1996

INVENTOR(S)   : Kwang-fu P. Hwang

It is certified that error appears in the above-identified patent and that said Letters Patent is hereby corrected as shown below:

Column 4, Line 66
  Delete "to be"

Signed and Sealed this

Eleventh Day of February, 1997

Attest:

Attesting Officer

BRUCE LEHMAN

Commissioner of Patents and Trademarks